Oct. 4, 1960 J. RABINOW 2,954,859
ELECTROMECHANICAL APPARATUS
Filed April 29, 1958 2 Sheets-Sheet 1

INVENTOR.
JACOB RABINOW
BY
*Joseph Weingarten*
ATTORNEY

United States Patent Office 2,954,859
Patented Oct. 4, 1960

2,954,859

ELECTROMECHANICAL APPARATUS

Jacob Rabinow, 1603 Drexel St., Takoma Park 12, Md.

Filed Apr. 29, 1958, Ser. No. 731,751

11 Claims. (Cl. 192—84)

The present invention relates in general to electromagnetic actuating mechanisms, and more particularly concerns techniques for utilizing a movable coil in a clutch or like apparatus for imparting axial displacements to a rotating shaft.

In its simplest form a clutch may comprise a complementary pair of friction discs secured to coaxial driving and driven shafts, together with a suitable linkage for selectively engaging or disengaging the discs to control the transmission of power. An exceedingly large number of arrangements for translating the friction discs independently of the rotation of either or both shafts have been described and illustrated in both patents and the literature. However, a very specialized problem of comparatively recent origin is presented in connection with clutches which must have extraordinarily high operating speed, negligible hysteresis, and precise, reproducible performance characteristics. The transports in the input-output magnetic tape mechanisms associated with modern high speed electronic digital computers are examples of systems which impose such requirements on clutches, and typically this problem has been solved in the past through the use of air pressure or vacuum-actuated devices, which however are inherently complex and costly, and which in themselves are frequently the cause of computer failure.

High speed electrodynamic clutches have been introduced which to some extent are capable of overcoming the severe shortcomings of prior devices, and among these are the clutches disclosed in my prior Patent 2,727,605 issued on December 20, 1955. Generally speaking, this patent describes clutch mechanisms wherein the required thrust is generated electrodynamically by the axial movement of a cylindrical coil suspended within a radial magnetic field. The utilization of this principle offers many advantages among which are (1) the torque developed is directly proportional to the current, (2) the absence of hysteresis in that when the current is reduced to zero the force exerted by the movable coil also falls to zero, (3) the absence of serious inductive effects since the movable coil impedance is substantially resistive, (4) the ability to generate substantially any force required free from the limitation ordinarily imposed by magnetic saturation of conventional iron core structures, and (5) the moving system of the movable coil clutch is of such low mass that exceedingly high speed operation is attainable.

Despite these advantages, however, certain limitations of previous movable coil clutches have become apparent, and with particular reference to the prior patent, it should be observed that it was necessary either to rotate the entire clutch structure including the iron magnetic field circuit, or alternatively, it was necessary to transmit translational forces from the rotating coil to the clutch plates through a rotary joint. The obvious objection to the first of these approaches was that the relatively large rotatable mass of iron required comparably large bearings and special care in achieving the high degree of dynamic balance which would enable relatively high speed rotation without excessive vibration. The use of a rotary joint which avoided the need for a rotating magnetic circuit was in itself disadvantageous in that extreme care, and consequently high cost, was necessary to insure the mechanical precision necessary to minimize compliance and play which would otherwise preclude actuation at the desired high speeds.

The present invention contemplates and has as a primary object the provision of an extremely high speed electromagnetic actuating mechanism particularly adaptable to clutches and linear actuators utilizing the rotating coil principle to achieve the inherent advantages described above while avoiding the limitations and faults encountered in the application of previous devices.

Broadly speaking, the present invention comprises a fixed, non-rotatable magnetic structure which defines an annular air gap magnetically energized so as to establish a generally radial magnetic field. A shaft journaled on the axis of the magnetic structure rotatably supports a cylindrical, solenoidal coil within the annular air gap for translational motion in a direction transverse to the aforesaid radial magnetic field. In this manner the coil may not only move axially, but is also free to rotate about the shaft axis within the air gap provided therefor. By passing a current through the coil, while stationary or rotating, axial forces are generated which may be transmitted to coacting members independently of either the instantaneous angular position of the coil or its rotational speed, while the magnetic field and the field producing magnetic members remain at rest.

As will be disclosed in detail below, axial motion of the rotating coil, in accordance with the principles of this invention, may be readily adapted to provide a variety of significantly useful applications. For example, it is possible to support the movable coil on one rotatable shaft whereby upon predetermined axial displacement thereof, a second rotatable shaft may be frictionally engaged for rotation in unison therewith. This arrangement furnishes a clutch which may be engaged or disengaged at exceptionally high speeds. Through a variation of these techniques, and by virtue of the bidirectional properties of the movable coil, coil motion in one direction may serve for clutch actuation, while opposite displacements achieved by a reversal of current functions to brake one of the rotating shafts. Modification of the bilateral motion structure may be used to achieve selective rotation of one of two concentric output shafts, or selective control of the direction of motion of an output shaft. And apart from its utility in clutch mechanisms, this invention may be used to achieve linear actuation of hydraulic and pneumatic valves, switches and the like.

It is therefore another object of the present invention to provide a high speed actuating mechanism utilizing a relatively lightweight rotatable coil operable within a stationary radial magnetic field.

It is a further object of the present invention to provide means for utilizing the bidirectional displacements of a lightweight coil rotatable in a radial magnetic field to achieve specialized actuator performance as a function of the direction of motion.

It is another object of this invention to provide actuator performance utilizing the moving coil principle consistently to achieve high speed and precision with particularly low driving power.

These and other objects of the present invention will become apparent from the following detailed specification taken in connection with the accompanying drawing in which.

Figure 1:
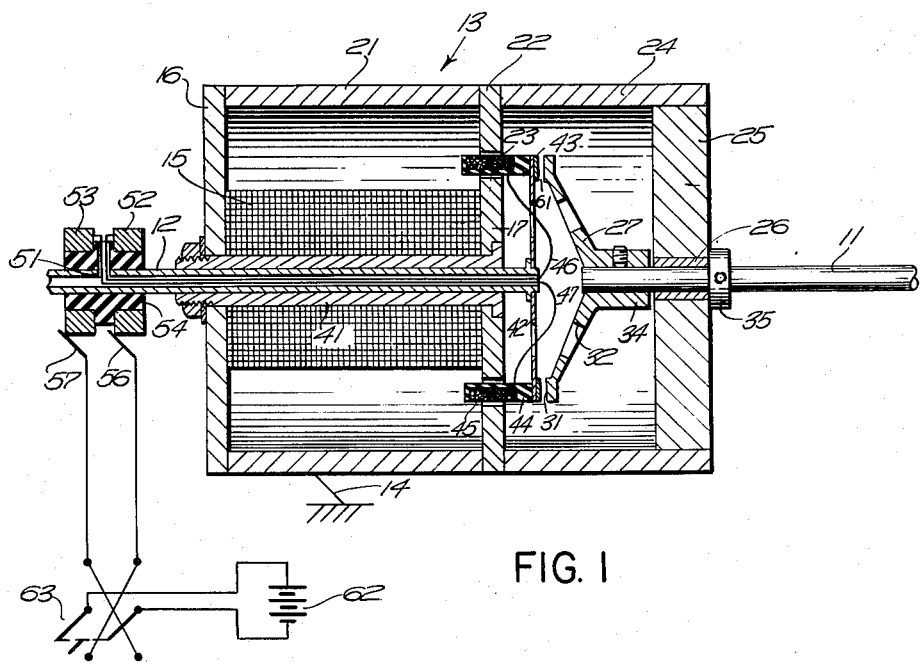
Fig. 1 is an axial cross-sectional view of a high speed clutch utilizing the rotatable coil principle of this invention.

With reference now to the drawing, the moving coil concept of this invention is illustrated in a number of specific clutch and actuator embodiments. In view of the general similarity of various structural elements shown in the several figures, like reference numerals have been used wherever possible to designate substantially identical components.

With specific reference to Fig. 1, there is illustrated a high speed clutch capable of selectively transmitting power between a pair of axially aligned shafts 11 and 12, either of which may be the driving or driven member. As they form no immediate part of this invention, both the driving power source and the useful load have been omitted from the drawing but it will be understood that a motor may be the basic source of input rotation while such apparatus as the magnetic tape transports heretofore mentioned, or for example, pen recorders, film transports and feeds, counters, stepping switches and the like may constitute the utilization apparatus.

Both shafts 11 and 12 are seen to extend coaxially through a generally cylindrical structure 13, which as diagrammatically indicated at 14, is securely, and non-rotationally fixed to a suitable reference frame or base structure, not shown. As is evident from the drawing, the cylindrical structure 13 provides means for rotationally supporting shafts 11 and 12 and additionally provides means for creating a desired magnetic field configuration. Thus, a hollow cylindrical magnetic source 15, preferably a powerful Alnico permanent magnet, is enclosed and clamped between a pair of circular magnetic end plates 16 and 17, the magnetic circuit being completed through an outer cylindrical magnetic member 21 and an annular magnetic plate 22. The inner circular edge of magnetic plate 22 and the outer circular edge of magnetic plate 17 define an annular air gap 23 which is traversed by a substantially radial magnetic field emanating from magnet 15.

The outer cylindrical housing is completed by a short cylindrical section 24 and a circular end plate 25, the latter two being preferably of non-magnetic material, such as aluminum or brass. The mechanical expedients for clamping the various cylindrical sections and circular plates together have not been illustrated to avoid the introduction of unnecessary, well-known elements to the drawing.

A sleeve bearing 26 rotatably supports shaft 11 within end plate 25, and shaft 11 at its inner end in turn supports a generally conical clutch plate 27 which at its outer circular edge 31 is flattened for purposes to be described hereinbelow. A plurality of circularly disposed openings, such as 32, serve to minimize the weight of clutch plate 27, while hub 34 and collar 35 serve to prevent undesirable axial movement of shaft 11.

At the opposite end of the clutch structure, a liner 41 extends through and is clamped within magnet 15. This liner serves as a bearing for shaft 12 which at its inner end rigidly supports a relatively thin axially flexible disc 42 which may be of steel, phosphor bronze, nylon, or the like. An annular friction ring 43 is adhered to one side of axially flexible member 42 for coaction with the flat face 31 of clutch plate 27.

A cylindrical coil form 44 is attached to the opposite face of disc 42 and, as indicated in the drawing, this coil form extends into the radial field established within the annular air gap 23.

A solenoidal, cylindrical coil 45 is wound within the coil form 44. The ends 46 and 47 of this winding are brought out as shown and passed through the hollow center of shaft 12 to a small opening 51 where they extend outwardly into electrical contact with a pair of slip rings 52 and 53, respectively, the latter being spaced and supported upon an insulator 54 which in turn is secured to shaft 12 by suitable means (not shown). A pair of conventional brushes 56 and 57 make electrical contact with the slip rings 52 and 53, respectively, and serve to permit the application of electrical power to coil 45 irrespective of the angular position or rotation of shaft 12.

Having described the structural features of the clutch shown in Fig. 1, the mode of operation will now be discussed. Assume that shaft 11 constitutes the input which, for example, may be driven continuously by an electric motor. In the absence of current through coil 45, axially flexible disc 42 will reside in the normal position shown, and as a result a small gap 61 will separate friction ring 43 from face 31 of friction clutch plate 27.

For convenience of demonstration, a battery 62 has been shown in Fig. 1 as a source of electrical power for activating coil 45. Battery 62 is connected to brushes 56 and 57 through reversing switch 63. Assume now that reversing switch 63 is closed with current flowing through coil 45 in a direction, with reference to the magnetic field established in gap 23, so that coil 45 is displaced to the right as viewed in Fig. 1. Under these circumstances the periphery of axially flexible disc 42 will be deflected to the right, whereby friction member 43 engages the flat annular surface 31 of clutch plate 27. Resultantly, shaft 12 will rotate in unison with shaft 11.

It should immediately be observed that under these conditions coil 45 will rotate continuously within the radial magnetic field established by magnet 15. However, such rotation will have no appreciable magnetic effect since current in the coil 45 generates only forces parallel to the axis in a symmetrical radial field. Observe also that apart from shaft 12, the only additional mass set into rotation by clutch engagement, are those of the coil 45, coil form 44 and the thin disc 42. This mass is comparatively light, so that the system inherently is of extremely low inertia, with consequent high speed. Additionally, coil 45 has a relatively low inductance so that current buildup and hence coil translation is exceedingly rapid.

Assume now that switch 63 is opened. This interrupts the current in coil 45, and due to low inductance, the force effect of this current vanishes almost instantaneously. As a result axially flexible disc 42 restores coil 45 to the normal position shown in Fig. 1, and separates friction plate 27 and friction ring 43 by the small gap 61. Power transmission between shaft 11 and shaft 12 is thus terminated.

As a further step, when it becomes desirable to disengage shafts 11 and 12, switch 63 need not only be opened, but may be thrown to the reverse position. This has the effect of reversing the current in coil 45 which accelerates its travel in the direction opposite of that required for engagement. The transmission of power is thus interrupted even more rapidly.

As indicated earlier, apart from the shafts 11 and 12, the rotating system of the clutch is inherently one of relatively low inertia. This when coupled with the fact that coil 45 is of low inductance and movable at extremely high speed permits substantially instantaneous engagement and disengagement of the rotating members. While the actual speed of operation will, of course, be dependent upon the physical size of the structural elements involved, the size of the load being accelerated by the driven shaft, and the magnitude of the coil current, it is appropriate to point out at this time that a clutch having the general mechanical configuration shown in Fig. 1 with a coil approximately 1½" in diameter with a one ohm impedance has exhibited, with negligible hysteresis, an engagement time of less than one millisecond and an equally fast release time. The output torque was a substantially linear function of the input voltage, a characteristic value being an output torque of twenty ounce-inches for an input voltage of eight volts.

Although the desired radial magnetic field was achieved by an Alnico permanent magnet, it is of course possible to substitute a suitable electromagnet in the form of a coil disposed in the region occupied by magnet 15 in Fig. 1. The electromagnet offers the advantage of adjustable field strength in the gap 23. Also, although D.-C. was shown as the source of actuating current in Fig. 1, it is equally possible to operate the system with alternating current provided however that an adjustment is made to insure that the currents flowing through the electromagnet and coil 45 are in phase.

In the discussion relevant to Fig. 1 it was indicated that the speed of disengagement could be materially improved by reversing the current through coil 45 with reversing switch 63. Advantage may be taken of the bidirectional characteristic of coil 45 in a manner disclosed in Fig. 2, which is a fragmentary cross-sectional view of a clutch having the general strucural characteristics of that shown in Fig. 1, modified to the extent that the axially flexible disc 42 extends radially outward beyond coil form 44 to support a second friction ring 71 on the side facing the annular magnetic member 22.

In operation when coil 45 is energized to bring friction member 43 into engagement with face 31 of clutch plate 27, shafts 11 and 12 rotate in unison as before. However, upon reversal of current in coil 45 in the manner disclosed in connection with Fig. 1, the axially flexible plate 42 is now deflected so that friction ring 71 is driven into engagement with the surface of annular member 22. This provides a braking action which instantaneously brings shaft 12 to rest.

This type of action is particularly advantageous in systems such as tape transports where it is desired to bring the tape to a halt as rapidly as possible after the feeding operation. The magnitude of the braking action is determined by the intensity of the reverse current, and it should be evident that instead of using the single battery and reversing switch principle illustrated in Fig. 1, the reversing current source for braking action may in fact be greater or smaller than the forward current which engaged shafts 11 and 12.

Figure 2:
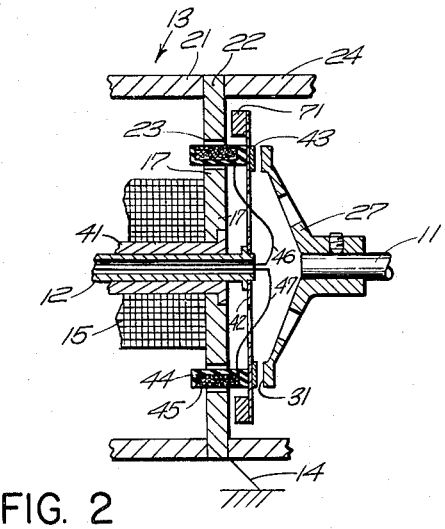
Fig. 2 is a fragmentary axial cross-sectional view of a high speed clutch generally similar to that disclosed in Fig. 1 but illustrating the advantages of bidirectional motion of the rotating coil.
Figure 3:
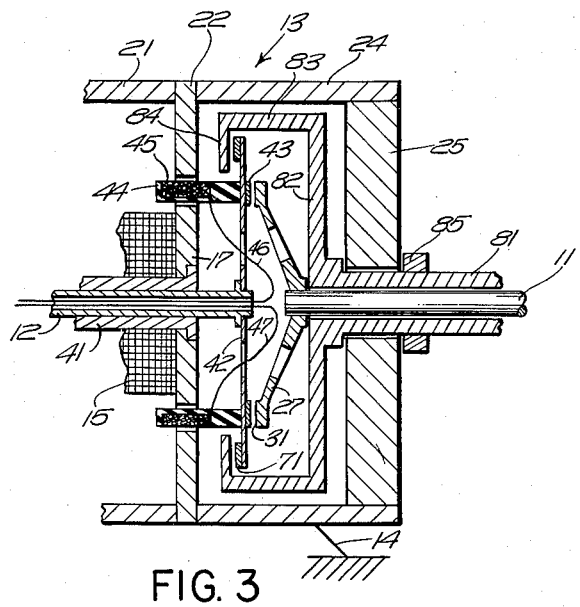
Fig. 3 is a fragmentary axial cross-sectional view of a high speed clutch wherein bidirectional motion of the rotating coil is used to selectively control the transmission of rotary motion among a number of shafts.

A further embodiment of the principles of this invention is illustrated in Fig. 3 which again is a fragmentary axial cross-sectional view of a clutch mechanism embodying generally the principles and structure shown in Fig. 1 together with the modifications thereof shown in Fig. 2. The function of friction ring 71, however, is somewhat different than that described in connection with Fig. 2. Thus, shaft 11 in Fig. 3 is surrounded by a concentric shaft 81 which is formed at its inner end with a radial plate-like extension 82 in the region between clutch plate 27 and the inner face of end plate 25. A cylindrical extension 83 of plate 82 terminates in a re-entrant flange 84 which lies in the region between friction ring 71 and the annular magnetic member 22. A collar 85 precludes axial motion of shaft 81.

Numerous applications of the arrangement disclosed in Fig. 3 are possible. For example, let us assume that shafts 11 and 81 are driven in opposite directions by appropriate sources of motive power. With coil 45 de-energized, small air gaps space friction rings 43 and 71 from the respective engaging surfaces. Accordingly, shaft 12 remains stationary.

However, in the event that coil 45 is energized by current flow in a direction which causes axial motion in the direction of shaft 11, friction ring 43 will engage surface 31 to cause rotation of output shaft 12 in one direction. If now the current in coil 45 is reversed, friction ring 71 will engage the inner surface of re-entrant flange 84 whereby shaft 12 will now rotate in the opposite direction. Thus, by control of the coil current, shaft 12 may be decoupled from shaft 11, or made to rotate in either direction as desired.

Other useful combinations are possible. If, for example, shaft 81 is held fixed during rotation of shaft 11, current flow in coil 45 in one direction will cause the engagement of friction ring 43 and annular face 31, and shaft 12 will rotate in the direction of shaft 11. Reversal of the current will permit friction ring 71 to brake the rotation of shaft 12 when desired.

If on the other hand shaft 11 were held stationary, and shaft 81 permitted to rotate, then current in the first-mentioned direction will produce a braking action while current in the opposite direction will produce rotation of shaft 12 in unison with shaft 81.

Also, instead of rotating shafts 11 and 81 in opposite directions, they may be rotated in the same direction at differing speeds. By a choice of the current direction through coil 45, therefore, shaft 12 may be clutched to either of two different speeds.

Again with reference to Fig. 3, if it should be desired to obtain a braking action independently of the direction of current, both shafts 11 and 81, or, in the absence of such shafts members 82 and 27 may be fixed relative to the housing. With no current through coil 45, shaft 12 may be rotated at a desired speed. By passing current through coil 45 in either direction the engagement of the respective friction ring 43 or 71 with the cooperative surface will serve to brake rotation of shaft 12.

Figure 4:
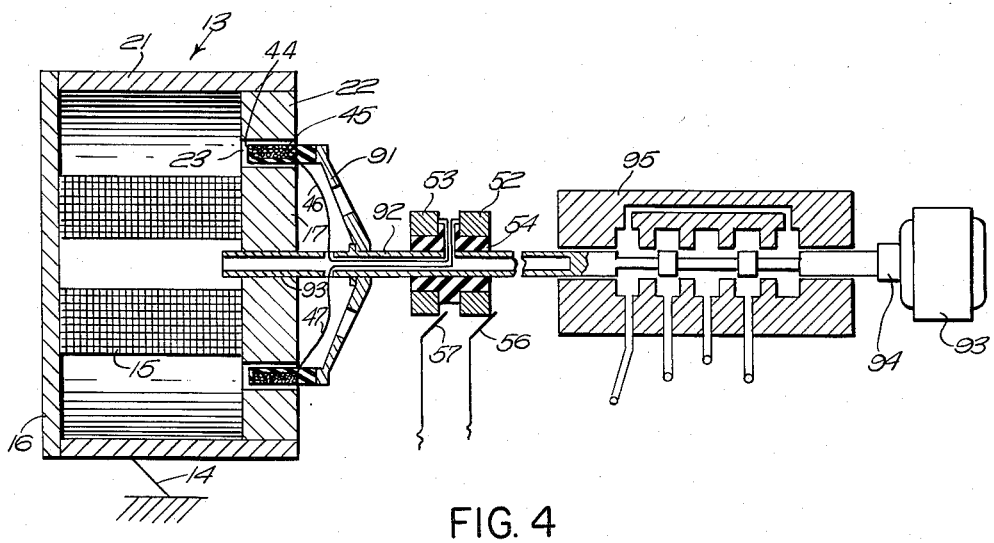
Fig. 4 is a general view, partly in axial cross section of the principles of this invention applied to achieve linear actuation of a rotatable shaft.

In Figs. 1, 2 and 3, the novel moving coil mechanism has been disclosed for the purpose of obtaining clutch and/or brake action. In Fig. 4 the very same principle is shown embodied in a linear actuator. More specifically, the means for obtaining a radial magnetic field in annular air gap 23 are essentially the same as that disclosed in the preceding figures. However, in Fig. 4 coil form 44 is attached to a rigid, generally conical support member 91, which is in turn secured to a rotatable shaft 92 journaled but axially slidable within an opening 93 in magnetic member 17. The slip ring and brush assembly 52, 53, 54, 56 and 57, permits the application of currents to coil 45 from a power source, not shown. Shaft 92 is rotated by a motor 93 through a spline connection 94.

As illustrated, axial displacements of shaft 92 serve to control the operation of a spool hydraulic valve 95 (the specific design of which forms no part of the present invention and will not be discussed in detail). In this application, motor 93 serves to rotate or oscillate the internal plunger of valve 95 to reduce static friction. Rotation of shaft 92 correspondingly rotates support 91 and coil 45. If only oscilaltions of the coil 45 and shaft 92 are needed, the slip rings 52 and 53 can be replaced by flexible pigtails.

As previously discussed, rotation of coil 45 is in itself without appreciable magnetic effect, irrespective of the current through coil 45. When coil 45 is energized through the brush and slip ring assembly, axial displacements to the right or left depending upon current direction, occur which drive the internal mechanism of the spool valve 95. Thus, the structure of Fig. 4 permits linear displacements of the shaft 92 in accordance with predetermined control signals applied to the brushes 56 and 57 notwithstanding the degree of rotation or oscillation thereof. It is important to note that the inertia of the rotating shaft 92 has been increased only by the slip ring assembly and the relatively lightweight coil and coil support.

Magnetic members 22 and 17 in Fig. 4 are somewhat thicker than the correspondingly designated members of Figs. 1, 2 and 3. In the case of the clutches disclosed in the previous figures, the actual degree of axial motion required to engage and disengage the rotating members was relatively small. In the embodiment shown in Fig. 4, however, relatively large axial displacements may be required, and to accommodate this, the radial air gap 23 is made of relatively greater depth. If desired, the axial motion of shaft 92 may be restrained by a spring or like device so that the displacement of the shaft will be essentially proportional to the current flowing through coil 45.

In the preceding discussion, a coil rotating in a radial magnetic field has been disclosed as the means for obtaining accurate motion with relatively low driving power. Due to the inherent light weight of the rotating elements, high speed operation is obtainable whether used for clutches, linear actuators, or other mechanisms. The coil motion may be controlled precisely by the current magnitude and by current reversal, the bidirectional characteristics may be made to serve useful functions.

As many modifications and departures of the principles disclosed in the foregoing may now become apparent to those skilled in the art, it is preferred that the spirit and scope be considered not as confined to the precise structural details herein set forth but by the spirit and scope of the appended claims.

What is claimed is:

1. Electromechanical apparatus comprising, a rotatable shaft, a magnetic structure fixed relative to said shaft and defining an annular gap coaxial with said rotatable shaft, means associated with said magnetic structure for estblishing a substantially constant radial magnetic field in said gap, a cylindrical coil symmetrically disposed within said gap coaxially of said shaft and in non-contacting relationship with said magnetic structure for motion transversely of said magnetic field, and radially extending means for securing said coil to said shaft for rotation in unison therewith.

2. An electromagnetic clutch for transmitting rotary motion between first and second rotatable shafts comprising, a relatively fixed magnetic structure defining an annular gap, means associated with said magnetic structure for establishing a substantially constant radial magnetic field in said gap, a generally cylindrical coil attached to said first shaft arranged for rotation in unison therewith and disposed within said gap for motion transversely of said magnetic field in non-contacting relationship with said magnetic structure, and cooperative means associated with said cylindrical coil and said second shaft adapted for frictional engagement upon predetermined transverse motion of said coil in one direction, whereby rotary motion of one of said shafts is thereby transmitted to the other of said shafts.

3. An electromagnetic clutch for transmitting rotary motion between first and second coaxial rotatable shafts comprising, a relatively fixed magnetic structure defining an annular gap coaxial with said rotatable shafts, means associated with said magnetic structure for establishing a substantially constant radial magnetic field in said coaxial gap, a cylindrical coil symmetrically disposed within said gap for motion transversely of said magnetic field and coaxially of said shafts, axially flexible means for securing said coil to said first shaft, and cooperative means associated with said coil and said second shaft adapted for frictional engagement upon predetermined axial motion of said coil in one direction.

4. An electromagnetic clutch in accordance with claim 3 and including slip-rings and brushes associated with said first shaft for electrically energizing said coil during rotation thereof in said radial magnetic field.

5. An electromagnetic clutch in accordance with claim 3 and including cooperative means associated with said coil and said fixed magnetic structure adapted for frictional engagement upon predetermined axial motion of said coil in the opposite direction.

6. An electromagnetic clutch for transmitting rotary motion between first and second coaxial rotatable shafts comprising, a relatively fixed magnetic structure having a central magnetic core formed with an axial opening for said first shaft and an outer magnetic circuit cooperative with said central core and defining therewith a coaxial cylindrical air gap, means associated with said magnetic structure for establishing a substantially constant radial magnetic field within said cylindrical gap, a cylindrical coil symmetrically disposed within said gap for motion transversely of said magnetic field and coaxially of said shafts, axially flexible means for securing said coil to said first shaft for rotation in unison therewith, slip rings and brushes associated with said first shaft for electrically energizing said coil during rotation thereof in said magnetic field to impart axial motion thereto, and cooperative means associated with said coil and said second shaft adapted for frictional engagement and disengagement upon predetermined axial motions of said coil.

7. An electromagnetic clutch for transmitting rotary motion between first and second coaxial rotatable shafts comprising, a relatively fixed magnetic structure having a central magnetic core formed with an axial opening for said first shaft and an outer magnetic circuit cooperative with said central core and defining therewith a coaxial cylindrical air gap, means associated with said magnetic structure for establishing a substantially constant radial magnetic field within said cylindrical gap, a cylindrical coil symmetrically disposed within said gap for motion transversely of said magnetic field and coaxially of said shafts, axially flexible means for securing said coil to said first shaft for rotation in unison therewith, and confronting frictional engagement means secured to said second shaft and to said coil.

8. An electromagnetic clutch for transmitting rotary motion between first and second coaxial rotatable shafts comprising, a relatively fixed magnetic structure having a central magnetic core formed with an axial opening for said first shaft and an outer magnetic circuit cooperative with said central core and defining therewith a coaxial cylindrical air gap, means associated with said magnetic structure for establishing a substantially constant radial magnetic field within said cylindrical gap, a cylindrical coil symmetrically disposed within said gap for motion transversely of said magnetic field and coaxially of said shafts, axially flexible means for securing said coil to said first shaft for rotation in unison therewith, a generally circular ring of frictional material secured to said axially flexible support for said coil, and a friction plate secured to said second shaft and extending radially outward and having a generally circular area confronting said frictional material, said ring of frictional material and said friction plate being engaged and disengaged in response to predetermined axial motion of said coil.

9. An electromagnetic clutch for transmitting rotary motion comprising, first and second concentrically rotatable shafts, a third rotatable shaft coaxial with and spaced from said concentric shafts, a relatively fixed magnetic structure defining an annular gap coaxial with said rotatable shafts, means associated with said magnetic structure for establishing a substantially constant radial magnetic field in said coaxial gap, a cylindrical coil symmetrically disposed within said gap for motion transversely of said magnetic field and coaxially of said shafts, axially flexible means for securing said coil to said third rotatable shaft, first cooperating frictional means engageable upon axial motion of said coil in one direction for coupling said third and first shafts, and second cooperating frictional means engageable upon axial motion of said coil in the opposite direction for coupling said third and said second shafts.

10. An electromagnetic clutch in accordance with claim 9 wherein said first cooperating frictional means includes a ring of frictional material on one side of said axially flexible means and a coacting friction plate secured to said first shaft, and wherein said second cooperating frictional means includes a ring of frictional material on the opposite side of said axially flexible means and a coacting re-entrant friction plate secured to said second shaft.

11. An electromechanical actuator for imparting axial displacements to a rotatable shaft comprising, a relatively fixed magnetic structure defining a circular gap coaxial with said rotatable shaft, means associated with said magnetic structure for establishing a substantially constant radial magnetic field in said circular gap, a cylindrical coil symmetrically disposed within said gap for motion transversely of said magnetic field and coaxially of said shaft, means in said fixed magnetic structure for rotatably supporting an end of said shaft, radially extending means for rigidly securing said coil to said shaft, and slip-rings and brushes associated with said shaft for electrically energizing said coil during rotation thereof, electrical energization of said coil being effective to impart corresponding axial displacements to said shaft notwithstanding rotation thereof.

References Cited in the file of this patent

UNITED STATES PATENTS

| | | |
|---|---|---|
| 2,119,819 | List | June 7, 1938 |
| 2,220,163 | List | Nov. 5, 1940 |
| 2,354,854 | Doll | Aug. 1, 1944 |
| 2,398,716 | Ojutkangas | Apr. 16, 1946 |
| 2,675,900 | Malick | Apr. 20, 1954 |
| 2,727,605 | Rabinow | Dec. 20, 1955 |
| 2,751,056 | Aumuller et al. | June 19, 1956 |

FOREIGN PATENTS

| | | |
|---|---|---|
| 946,866 | France | June 16, 1949 |